United States Patent
Syeda-Mahmood

(10) Patent No.: US 6,469,706 B1
(45) Date of Patent: Oct. 22, 2002

(54) METHOD AND APPARATUS FOR DETECTING REGIONS BELONGING TO A SPECIFIED COLOR SURFACE IN AN UNSEGMENTED IMAGE

(75) Inventor: Tanveer Fathima Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,852

(22) Filed: Nov. 16, 1999

(51) Int. Cl.⁷ .................................................. G09G 5/02
(52) U.S. Cl. ....................... 345/589; 345/581; 345/591; 345/592; 345/593; 345/597
(58) Field of Search ................................ 345/581, 589, 345/591, 592, 593, 601, 602, 596, 594

(56) References Cited

U.S. PATENT DOCUMENTS

| | | | |
|---|---|---|---|
| 4,203,671 A | | 5/1980 | Takahashi et al. .......... 356/402 |
| 4,414,635 A | * | 11/1983 | Gast et al. .................. 364/526 |
| 4,623,973 A | | 11/1986 | Hoffrichter et al. ......... 364/526 |
| 4,884,130 A | | 11/1989 | Huntsman .................... 358/80 |
| 4,917,500 A | | 4/1990 | Lugos ........................ 356/406 |
| RE33,244 E | | 6/1990 | Davis et al. ................ 364/526 |
| 5,087,965 A | * | 2/1992 | Torre-Bueno ................ 358/22 |
| 5,109,274 A | * | 4/1992 | Washio et al. ................ 358/80 |
| 5,220,646 A | | 6/1993 | Fossum ....................... 395/122 |
| 5,307,088 A | | 4/1994 | Inuzuka et al. ............. 345/153 |
| 5,386,483 A | | 1/1995 | Shibazaki .................... 382/22 |
| 5,390,035 A | | 2/1995 | Kasson et al. .............. 358/518 |
| 5,517,334 A | | 5/1996 | Morag et al. ............... 358/518 |
| 5,568,555 A | | 10/1996 | Shamir ......................... 380/51 |
| 5,754,184 A | | 5/1998 | Ring et al. .................. 345/431 |
| 5,796,410 A | * | 8/1998 | Baird ......................... 345/471 |
| 5,796,869 A | * | 8/1998 | Tsuji et al. ................. 382/203 |
| 6,226,400 B1 | * | 5/2001 | Doll ........................... 382/163 |

OTHER PUBLICATIONS

"Presentation Space Coloring," *IBM Technical Disclosure Bulletin*, vol. 38, No.3, Mar. 1995, pp. 539–540.
"Color Graphics Picture Segmentation," *IBM Technical Disclosure Bulletin*, vol. 32, No. 3B, Aug. 1989, pp. 384–387.

* cited by examiner

*Primary Examiner*—Matthew Luu
*Assistant Examiner*—Daniel J. Chung
(74) *Attorney, Agent, or Firm*—Lacasse & Associates, LLC; Randy W. Lacasse; Khanh Q. Tran, Esq.

(57) ABSTRACT

A surface color code book is used to allow region localization and recognition within images without the need for pre-segmentation of the image. Pixels in an image are first mapped into an optimal color space and assigned a closest color label from the surface color code book. Clusters of adjacent pixels having a similar color label are then tentatively grouped to form a region. These tentative regions are then projected into the optimal color space and a descriptor is formulated for each re-projected cluster. Each descriptor is compared against the color codes in the color code book to determine if the initially assigned color label was correct; if correct, then that region receives both a color label from the color code book and a region identifier.

22 Claims, 4 Drawing Sheets

METHOD AND APPARATUS FOR DETECTING REGIONS BELONGING TO A SPECIFIED COLOR SURFACE IN AN UNSEGMENTED IMAGE

BACKGROUND OF THE INVENTION

1. Field of Invention

The present invention relates generally to the field of image storage databases. More specifically, the present invention is related to localizing and recognizing colored objects in an unsegmented image.

This application is related to US co-pending applications respectively entitled METHOD AND APPARATUS FOR REPRESENTING COLORED SURFACES VIA A COLOR CODE BOOK, and METHOD AND APPARATUS FOR INDEXING AND RETRIEVING IMAGES FROM AN IMAGE DATABASE BASED ON A COLOR QUERY, both hereby incorporated by reference.

2. Discussion of Prior Art

The representation and discussion of color and color perception usually involves first defining a color space or color model. A color space (or model) comprises a plurality of attributes which are used to specify the variety of colors we perceive. Different colors are distinguished by having different attribute values.

One color model, or color space, is not absolutely better than another. They each have been designed from different perspectives and thus have different qualities, as well as handicaps, which make them each suitable for different applications.

RGB color space, probably the best known color model, is related to the hardware capabilities of a CRT which uses an electron gun to excite red, green, and blue phosphors to produce perceivable color. One difficulty with the RGB model is that it is quite sensitive to the variation in color values brought about by lighting changes. Intensity is distributed throughout all three parameters of this model, thus creating color values which are highly sensitive to scene brightness. In essence, the effect of a change in the illumination intensity of a scene is approximated by a multiplication of each RGB color by a uniform scalar factor.

A simple example of RGB color space's unstableness with respect to illumination is the gross change in perceived color which accompanies changing the brightness value on a computer monitor. Other color spaces have been developed which are more stable with respect to intensity variations. The HSV model is one such example.

Physiologically, human eyes tend to respond to and evaluate colors according to hue (H), saturation (S), and luminance (L). Hue refers to color produced by different wavelengths of light. Saturation refers to the measure of a pure hue in a color. As an example, red and pink are of similar hue but have different saturation levels. Brightness, luminance, or intensity is the measure of the amount of light reflected or emitted from an object. Because the luminance value is separate from H and V, this model shows more stability than the RGB model with respect to illumination differences. However, representation of color in the HSV model is not totally immune to illumination changes.

A number of color spaces have been developed, and will continue to be developed, to address the various applications which rely on color information to accomplish their goals. One useful undertaking, which is well known in the art, is the formulation of transform operations to map one color space into another. Using these transforms, a scene or image created for one application is appropriately mapped to a second color space for an application which benefits from the image being in the second representation.

One imaging application that is receiving a lot of attention is that of a large collection of images stored in a searchable database. In particular, querying such a collection to locate images which contain desired objects requires detection, recognition and indexing of color surfaces or objects within an image.

In the past, image content detection and recognition have relied on controlled imaging conditions of the objects of interest. Background surface color, illumination source, illumination quality, illumination amount, object orientation, shadowing and occlusion were all carefully controlled to ensure that proper recognition of an object was possible.

However, the ability to detect and recognize color surfaces or objects in images, across a wide range of imaging conditions, is fundamental to the creation of robust and useful content-based image retrieval systems. Image databases typically include images from a plurality of sources under a variety of imaging conditions. Consistent representation of a particular color surface throughout these varying conditions is necessary to enable color queries (i.e. queries for a particular color surface). The present invention introduces a color code book to provide an imaging-condition invariant representation of color surfaces present within an image. The prior art discussed below fails to provide for such a robust, compact and simple method of representing color surfaces.

As explained previously, color represented through three filtered channels (e.g. RGB) of a typical camera-grabbed input is notoriously unstable with respect to changes in imaging conditions. Prior art attempts at providing robust and accurate color representations include mapping images into a perceptually uniform color space (e.g. Lab, Munsell, etc.) and representing color as a function of surface reflectance. While attaining some limited success in improving color representation, both these methods require pre-segmentation of an image before color surface recognition analysis can occur in that image. Some prior art methods do avoid a pre-segmentation step but, as a result, require some simplifying approximations to be made such as assuming all surfaces are flat (e.g. Retinex theory) or that surfaces are linear combinations of only a few basic reflectances (e.g. Maloney and Wandel).

Image segmentation is generally recognized as the partition of an image into a set of non-overlapped regions, homogenous with respect to some criteria, whose union covers the entire image.

In the prior art described below, the examples of region localization and recognition methods all require segmentation of an image prior to subsequent analysis. Automated segmentation of images is very computationally and time intensive and often introduces errors due to its imprecision. Manual image segmentation, which is frequently more accurate, is typically labor intensive and cost prohibitive. Segmentation is a difficult and time consuming step because of the variety of artifacts that exist in images. Correctly determining where an object is and what an object is are both made difficult by object occlusion, illumination artifacts, shading, reflections, object orientation, and blending with a similar background or texture.

The present invention, unlike the prior art discussed below, enables the localization and recognition of image regions, or color surfaces, without first requiring pre-segmentation of an image.

The patent to Takahashi et al. (U.S. Pat. No. 4,203,671) provides for a method of detecting, within RGB space, whether or not an image region is human skin under various conditions.

The patent to Gast et al. (U.S. Pat. No. 4,414,635) provides for a method of labeling regions according to the color of pixels within the region, but utilizes a predetermined light source for imaging.

The patent to Hoffrichter et al. (U.S. Pat. No. 4,623,973) provides for a color recognition method which transforms an RGB pixel value of a pre-isolated color region into a luminance-chrominance space.

The patent to Huntsman (U.S. Pat. No. 4,884,130) provides for a new color space which describes colors in a way more closely related to human color perception.

The patent to Lugos (U.S. Pat. No. 4,917,500) provides for an object recognition system which only works on pre-segmented images under predetermined lighting conditions.

The patents to Inuzuka et al. (U.S. Pat. No. 5,307,088) and Morag et al. (U.S. Pat. No. 5,517,334) provide for a method of quantitizing and transforming pixel colors from one color space to another. Recognizing and locating color surfaces do not appear to be discussed.

The patent to Davis et al. (U.S. Pat. No. RE 33,244) provides for a color transparency printing system which dynamically adjusts color look-up tables in response to non-linearities in the components of the system. However, no optimization of the actual color space to assist with surface recognition is provided.

The patent to Washio et al. (U.S. Pat. No. 5,109,274) provides for an image processing system which determines the chromatic and achromatic nature of an image in order to implement appropriate algorithms for that image type.

The patent to Fossum (U.S. Pat. No. 5,220,646) provides for a computer graphics system which implements a z-buffer such that colors of rendered images and background colors can be determined and hidden lines removed in a single memory pass. While applicable to polygon images, this system does not appear to consider color surface detection or coding.

The patent to Shibazaki (U.S. Pat. No. 5,386,483) provides for a method of iteratively examining image regions to determine pixel colors to assist with choosing overlapping regions in order to achieve high printing quality.

The patent to Kasson et al. (U.S. Pat. No. 5,390,035) provides for mapping a 3-dimensional input color domain into an m-dimensional color space. The conversion method is directed towards generating a function which improves accuracy while minimizing computational burden; color surface differentiation does not appear to be discussed.

The patent to Shamir (U.S. Pat. No. 5,568,555) provides for an encoding system which increases symbol density by utilizing both color and color intensity as variables. Linear analysis is performed to calibrate color intensities from different colorant sources; however, a color code book training system or analysis of free-form images is not provided.

The patent to Ring et al. (U.S. Pat. No. 5,754,184) provides for an image fidelity system which converts images from a device-dependent space to a device-independent space.

The IBM TDB entitled "Color Graphics Picture Segmentation" describes a method of compressing images which segments neighborhoods of pixels that have similar colors that are separated by pixels having a different color. Each pixel is mapped to one of N allowable colors thus segmenting the image into N color regions.

The IBM TDB entitled "Presentation Space Coloring" describes an object-oriented method of generically specifying color which is independent of the underlying system data types and resolution. While not color-space dependent, this scheme does not consider combining color spaces or optimizing a color space to aid with surface recognition.

Whatever the precise merits, features and advantages of the above cited references, none of them achieve or fulfill, individually or in combination, the purposes of the present invention. Specifically, they fail to provide for a compact and simple coding of color surfaces which provides robust representation of the surfaces under varying imaging conditions. Without such a color surface code book, the prior art also fails to provide for an image region localization and recognition method that can be performed on an unsegmented image. In addition, the prior art fails to show an image database indexing method which relies on a color surface code book to provide the ability to perform color queries.

SUMMARY OF THE INVENTION

Localization and recognition of colored surfaces within an image is accomplished without the need to segment the image prior to analysis. Pixels in an image are initially labeled according to color. Similarly-colored, adjacent pixels from an image are then grouped together and projected into a color space. The mathematical description of these pixel groupings is then compared to entries in a color code book to determine whether or not the initially assigned color values are correct. The color code book entries provide descriptions of a variety of colored surfaces under varying imaging conditions.

DESCRIPTION OF THE PREFERRED EMBODIMENTS

Figure 1:
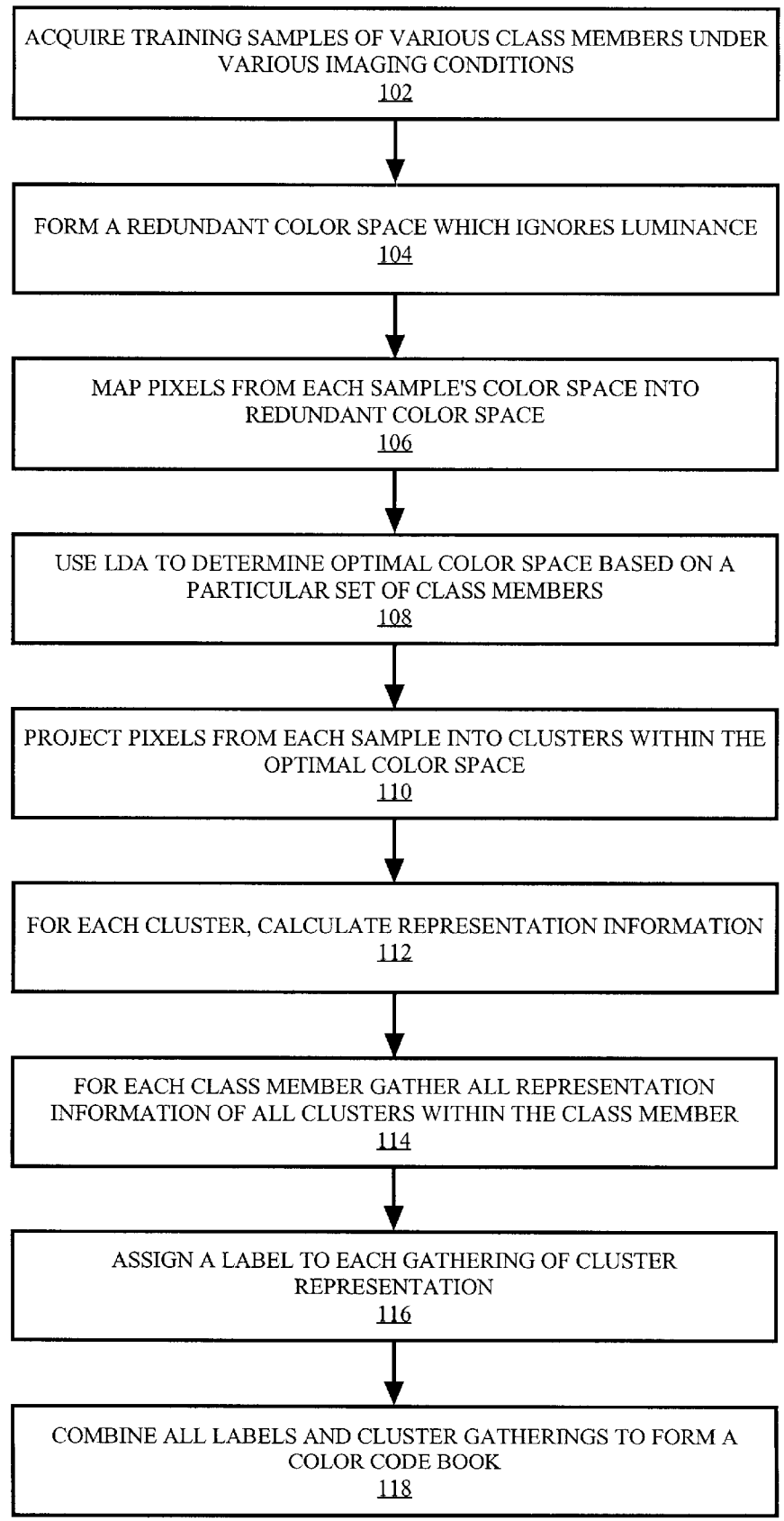
FIG. 1 illustrates a method to form a color code book according to the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

In order for a color description scheme to be useful in such diverse areas as content-based image retrieval, color fidelity during scanning, printing, transmission and rendering of color images, image recognition, and surface localization, the scheme must be robust to changes in imaging conditions such as illumination changes, illumination artifacts, occlusions and pose changes.

As described earlier, the typical RGB color space of digital cameras and frame-grabbers is particularly unstable in its description of color with respect to changes in imaging conditions. While earlier methods to improve color stability have been proposed that involve mapping RGB color space into a more stable representation, the present invention uses an optimal color space and creates a color code book, which provides a simple and compact representation of color surfaces present in a collection of images.

The current invention provides a method of representing colored surfaces in a manner which is resistant to changes in illumination of the surface and changes in the surface's appearance (e.g. pose, orientation). A multistep method is illustrated in FIG. 1 which generates a color code book that captures, in a simple and compact form, the description of color surfaces under different imaging conditions.

SURFACE COLOR CODE BOOK

The first step 102 is to obtain training samples of color surface classes under a number of lighting conditions and of various surface class members. The training samples are referred to as patches and are a variety of representative images of a particular color surface class.

For a particular color surface class (e.g. skin, sky, grass, etc.), a number of images of sample patches are acquired under well chosen illumination conditions. Examples of some, but not all, lighting conditions are 1) natural outdoor lighting including morning, mid-day and evening, 2) artificial outdoor lights (e.g. floodlights), 3) natural indoor lighting, including sunlight filtering through windows, curtains, and skylights, and 4) artificial indoor lights including tungsten, fluorescent, household light bulbs, etc. The more patches that are acquired the more accurate the color surface recognition and localization will be, due to the more robust surface description that results.

In addition, the sample surface patches acquired include different members of that particular surface class. As an example, if the surface class is skin, then images of Caucasian, Black and Asian skin, as well as other races, are acquired also.

The underlying goal when acquiring sample patches is to select them in such a manner so as to increase statistical variation within and among the patches. In a preferred embodiment, therefore, patches are acquired of non-flat portions of color surfaces, patches are approximately 40×40 pixels, and for colors where there are many shades (e.g. oranges and reds) more sample patches are acquired than for colors having fewer shades (e.g. blues). These specific criteria, while not absolutely required, work together to increase the patches' statistical variations. Typically, 9 to 10 sample patches per surface are sufficient to provide the necessary variation and no requirement exists that each class have the same number of patches nor that each sample patch have the same size.

Conventional digital cameras and frame-grabber hardware is preferably used to acquire the sample patches. Typically, these devices represent the image in RGB color space. Other methods of acquiring images and other color spaces, however, are also contemplated to be within the scope of the present invention.

For each sample patch image acquired in the previous step, the pixels are mapped 106 to a redundant color space of at least four dimensions formed by combining multiple conventional color spaces 104. Furthermore, the pixel is mapped in such a way as to ignore its luminance component.

A number of different ways of mixing conventional color spaces to form the target redundant color space are possible. As an example, YES space (ignoring the Y component), a common Xerox™ encoding standard, combined with Ohta and Kanade space (also ignoring the Y component) provides a 4-dimensional color space which ignores luminance.

While this example is a preferred redundant space, other color space combinations and even those of higher dimensions than 4 are contemplated within the scope of the present invention. As an example, YES and YIQ is another combination which provides a 4 dimensional redundant space once the Y components are ignored. In general, linear combinations of RGB derived spaces, again ignoring any luminance component, are combinable to form higher-dimensional, redundant color spaces. Non-linear spaces such as CIE-XYZ, CIE-xyY, CIE-uvY, etc. require knowledge of the illuminant being used and do not combine well to form a redundant space.

The next series of steps 108 perform Fisher discriminant analysis (FDA) to separate and characterize the colored surfaces of interest. The goal of FDA is to derive a transformation of vector space which decreases the overlap of class distributions and thus increases the correct classification rate. As applied here, the goal is to create a color space such that when pixels from an unknown surface are mapped into it, the likelihood of correctly determining which color surface class the pixels are from is maximized. The general concepts of cluster analysis and discrimination are known; however, the present invention's application of these principles to color spaces is novel. A full description of those elements as applied specifically to color surfaces is provided. A rigorous proof of each mathematical step, however, is not necessary for a complete understanding of the present invention.

To aid in referring to the different objects being manipulated in this analysis each color surface is designated as a class.

Each pixel, x[t], in the redundant color space is considered to be a multidimensional vector, particularly 4D in the preferred embodiment. A matrix, Sc[c], is defined as the unnormalized class covariance matrix and is given by the following sum over all x[t] which belong to a class (i.e. color surface) c.

$$Sc[c]=\Sigma(x[t]-u[c])(x[t]-u[c])^T$$

Where u[c] is the mean vector of the c-th class.

A within-class scatter matrix, WSc, is obtained by combining the class-specific scatter matrices Sc[c] for all classes:

$$WSc=\Sigma Sc[c]$$

A between-class scatter matrix, BSc, is obtained by the following summation over every class c:

$$Bsc=\Sigma n[c](u[c]-u)(u[c]-u)^T$$

Where u is the total mean vector of all x[t] and n[c] is the number of vectors x[t] for the c-th class.

There exists a matrix W which maximizes the quotient:

$$J(W)=|W^T BScW|/|W^T WScW|$$

The columns of the optimal matrix W are the generalized eigen vectors of the following expression:

$$BSc\ w[i]=L[i]WSc\ w[i]$$

Where L[i] is the i-th eigen value and w[i] is the i-th column of W and corresponds to the i-th eigen vector. In a preferred embodiment, the first (largest) eigen vector, V, is determined and removed from the equation which is then re-optimized to find the second largest eigen vector V'. Alternatively, choosing V' to be the eigen vector corresponding to the second largest eigen value during the original optimization often provides sufficient discrimination between surface classes. While using other eigen vectors is an alternative, the larger the eigen value, the more discriminative the direction represented by the eigen vector. The remaining eigen vectors contribute little to discrimination and their inclusion can actually hurt performance since they essentially represent noisy components of the original signal.

The two eigen vectors chosen, typically denoted V and V', are combined to form an optimal color space 108 into which the pixels, x[t], are transformed.

The next step 110 of creating the surface color code book, involves orthogonally projecting all pixels, from the redundant color space, into the optimal color space. One result of the projection is that the surface representation is pose invariant since no image position information is retained in the color description.

Within the optimal color space, clusters of pixels are formed by transforming pixels from the sample patches into this new space. There is not a one-to-one correspondence between sample patches and clusters; similar sample patches may map into the same cluster within the optimal color space. As an example, within the class "skin", sample of Asian skin under similar lighting conditions will likely map into the same cluster. The notation used is: there are j color surface classes (e.g. skin, sky, grass, etc.) and for each class there are i clusters.

A mathematical representation for each cluster of pixels is now calculated to form the color code portion of the color code book. For each cluster of pixels within the optimal color space, a mean, $M_{ij}$, a covariance matrix, $A_{ij}$, eigen values, $\gamma_{ij}$, and eigen vectors, $\psi_{ij}$, are calculated. In particular, it is noted that the different clusters from a particular color surface are of elliptic shape and have a commonality of direction (or orientation) that remains largely unchanged under changes in appearance due to illumination and other imaging conditions. However, the location of the cluster in a color space does change with illumination and thus choosing a range of illuminations results in modeling a surface as a collection of parallel clusters in color space. The clusters, being elliptic-shaped, are completely represented by their mean and covariance matrix (including eigen values and eigen vectors). One novel aspect of the present invention is that the optimal color space, formed from {V, V'}, varies according to the color surface classes that need to be distinguished. Particular to the present invention, this means that a color code book, optimized for a particular set of likely-to-be-encountered color surfaces, is used to improve surface classification decisions during subsequent image analysis operations.

Next, each color surface class is assigned 116 a semantic label, $C_j$ (e.g. skin, grass, sky, etc.) and associated 114 with all its different cluster representations to create a set:

$$<C_j, \{(M_{1j}, A_{1j}, \gamma_{1j}, \psi_{1j}), (M_{2j}, A_{2j}, \gamma_{2j}, \psi_{2j}), \ldots\}>$$

Finally, the color code book is formed by combining 118 all the different class representations:

$$\{\langle V, V'\rangle, \{\langle C_1, \{(M_{11}, A_{11}, \gamma_{11}, \Psi_{11}), (M_{21}, A_{21}, \gamma_{21}, \Psi_{21}), \ldots\}\rangle,$$
$$\langle C_2, \{(M_{12}, A_{12}, \gamma_{12}, \Psi_{12}), (M_{22}, A_{22}, \gamma_{22}, \Psi_{22}), \ldots\}\rangle,$$
$$\ldots$$
$$\ldots$$
$$\ldots\}\}$$

Note that the color code book has a color space, {V, V'} associated with it implicitly.

Many different specific manners of internal storage of the color code book in a computer system are contemplated within the scope of the present invention. A preferred storage arrangement uses the color code book as a type of index table with entries consisting of semantic labels and short multi-digit codes. These codes, or labels, are then used as an index to the actual, multi-parameter representations of the color surfaces.

Thus a surface color code book is formed which 1) describes a color surface using a compact code which is invariant to illumination and pose changes, 2) is formed in an optimal color space which varies based on all the color surfaces being distinguished, and 3) represents each surface color class by a list of clusters described by their mean, covariance, eigen values and eigen vectors.

As previously discussed, one benefit of a color code book as described above is that detection and recognition of colored surfaces within images is accomplished without the need to pre-segment the image.

REGION LOCALIZATION AND DETECTION

Figure 2:
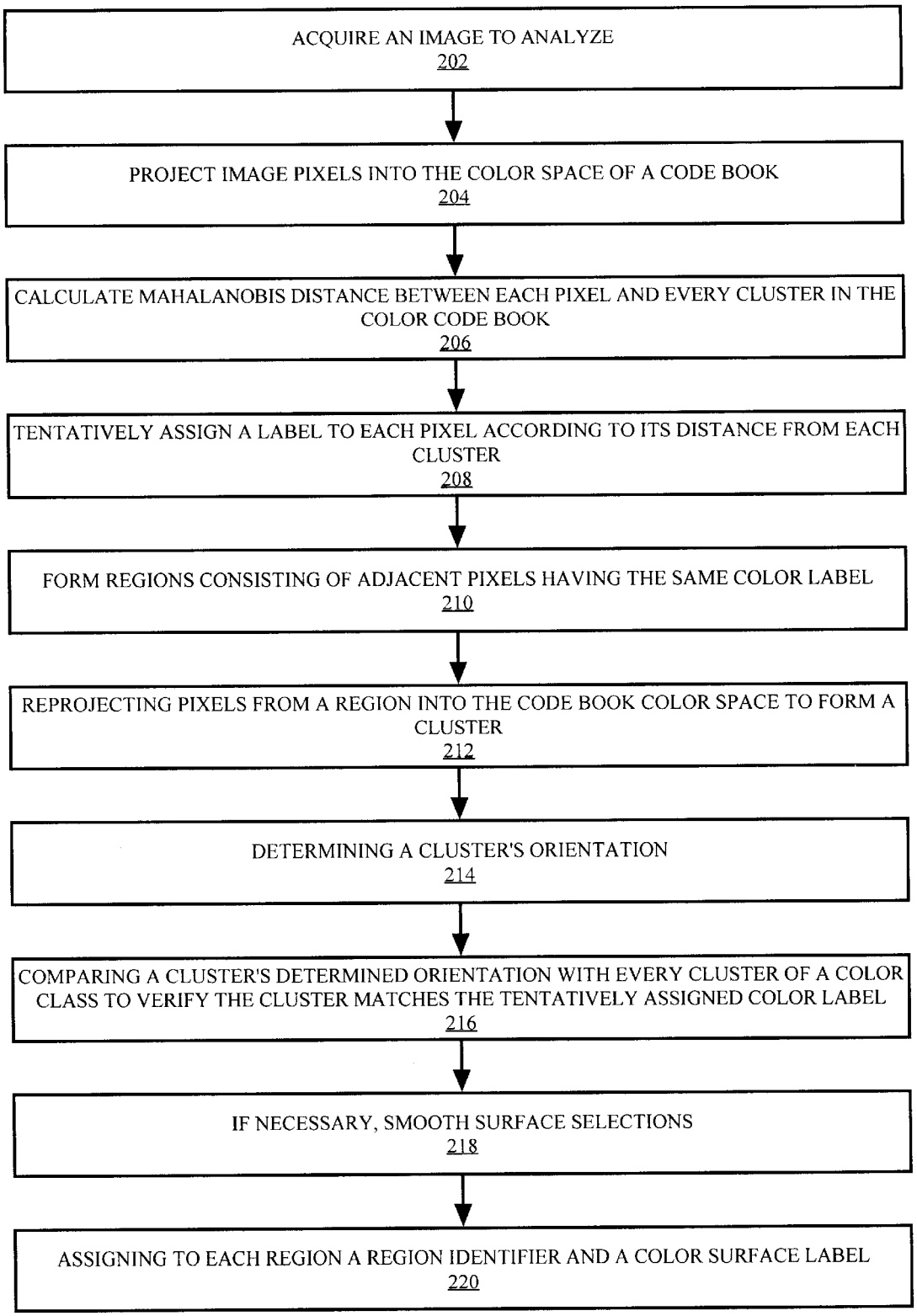
FIG. 2 illustrates a method to detect and label color regions within an image according to the present invention.

FIG. 2 illustrates the steps of a method used to locate regions in an image corresponding to a particular surface and assigning an appropriate label, from the color code book, to those regions.

The first step, after acquiring a subject image 202, is to project every pixel in an image to be analyzed into the color space of the color code book 204. As with the training patches described earlier, the pixel must first be mapped into a redundant color space. In many image database applications, a commonality exists between the surfaces likely to be present in the given images. In the preferred embodiment, therefore, a code book and its accompanying color space, is selected according to the color surfaces anticipated. However, the present invention considers, within its scope, other criteria for selecting color code books.

The closest color surface class is then assigned to each pixel. To determine the closest color surface class label, the Mahalanobis distance, a rotation invariant distance measurement, is calculated 206 between each projected pixel and the centroid of each cluster in the color code book.

The Mahalanobis distance, r, is calculated according to:

$$r^2 = (x-m_x)^T C_x^{-1}(x-m_x)$$

Where x is the pixel vector, $m_x$ and $C_x$ are the mean and covariance of each code book cluster, respectively.

Pixels whose Mahalanobis distance to a particular centroid is within a specified threshold are tentatively assigned 208 the label from the code book corresponding to that particular centroid's surface color class. Preferably, a normalized threshold of 4 to 10 provides sufficient discrimination between possible color classes.

Regions of pixels are then formed 210 which consist of adjacent pixels having the same color class label.

For each such region formed, all the pixels in that region are reprojected 212 into the color space of the color code book to form a test cluster. The orientation of this test cluster, determined by calculating the eigen vector of its covariance matrix 214, is then compared 216, with the orientation of all the clusters of the tentatively assigned color surface class from the color code book.

In practice, the cluster orientations, $\psi_{ij}$, within a class in a color code book vary from $\alpha$ to $\beta$ and a test cluster's orientation which falls between $\alpha-5°$ and $\beta+5°$ is considered to match a class from the color code book.

The region whose test cluster passes the orientation comparison is determined to truly be of that particular color surface class that was tentatively assigned earlier. Failure of the orientation test determines that this particular region is not a representation of the expected color surface class.

This method first assures a match of a region to some appearance of a surface class within the code book and the later verification ensures a spectral match between the region and at least one cluster of that particular surface class. If a pixel is assigned to multiple color surface classes, an image smoothing filter 218 will eliminate such plurality of assignments so that the end result is a clear detection of the color surface classes present in an image. Finally, to complete region localization and recognition, each detected region within an image is given 220 a region identifier and assigned 220 the color surface semantic label from the color code book.

DATABASE INDEXING AND QUERYING

Figure 3:
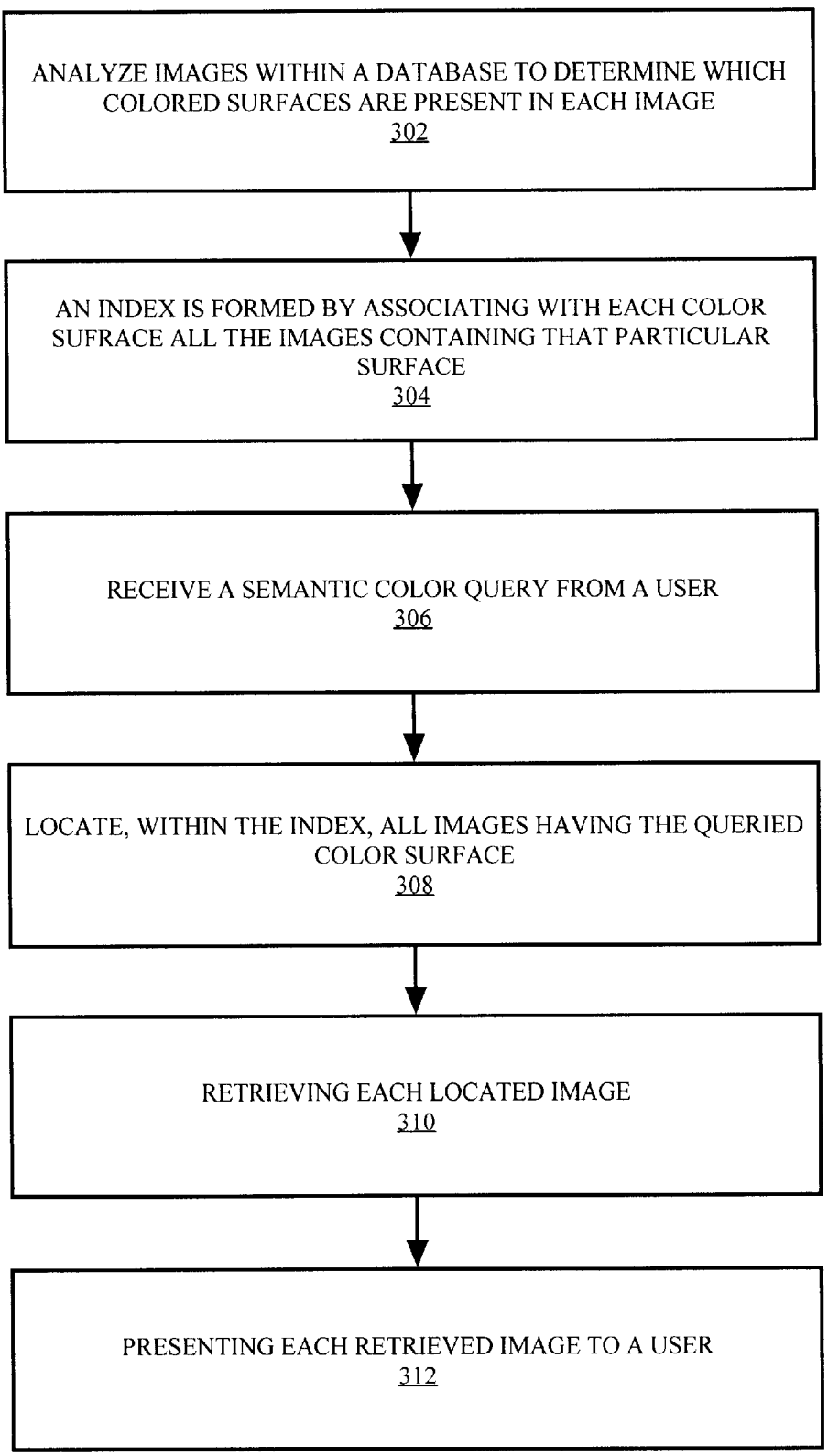
FIG. 3 illustrates a method of indexing an image database, according to the present invention, in order to retrieve images by semantic color queries.

The use of the color code book and the detection of color surface classes without pre-segmenting an image have tremendous application to improving database indexing and retrieving of images in response to a color-related query. FIG. 3 illustrates a method of indexing and querying an image database.

To begin with, each image in a database is analyzed 302. And for every color surface class in the color code book, regions of the images are detected which belong to that color surface class. Preferably, the detection and classification of color surface regions are performed according to the method described in FIG. 2. However, other region localization and detection methods are considered within the scope of the present invention.

A color region index is then formed 304 containing all regions, belonging to a specific colored surface class:

$$C_i => \{<R_j, I_k>...\}$$

Where $C_i$ is a semantic label for a color surface class and $R_j$ is the region identifier of a region belonging to image $I_k$.

By well-known look-up methods, the database receiving 306 a semantic user query for images having sky, grass, skin, etc. will use the color region index to locate 308 and retrieve 310 relevant images and regions that possess the query surface. An appropriate GUI is then used to display the retrieved images for the user 312.

Figure 4:
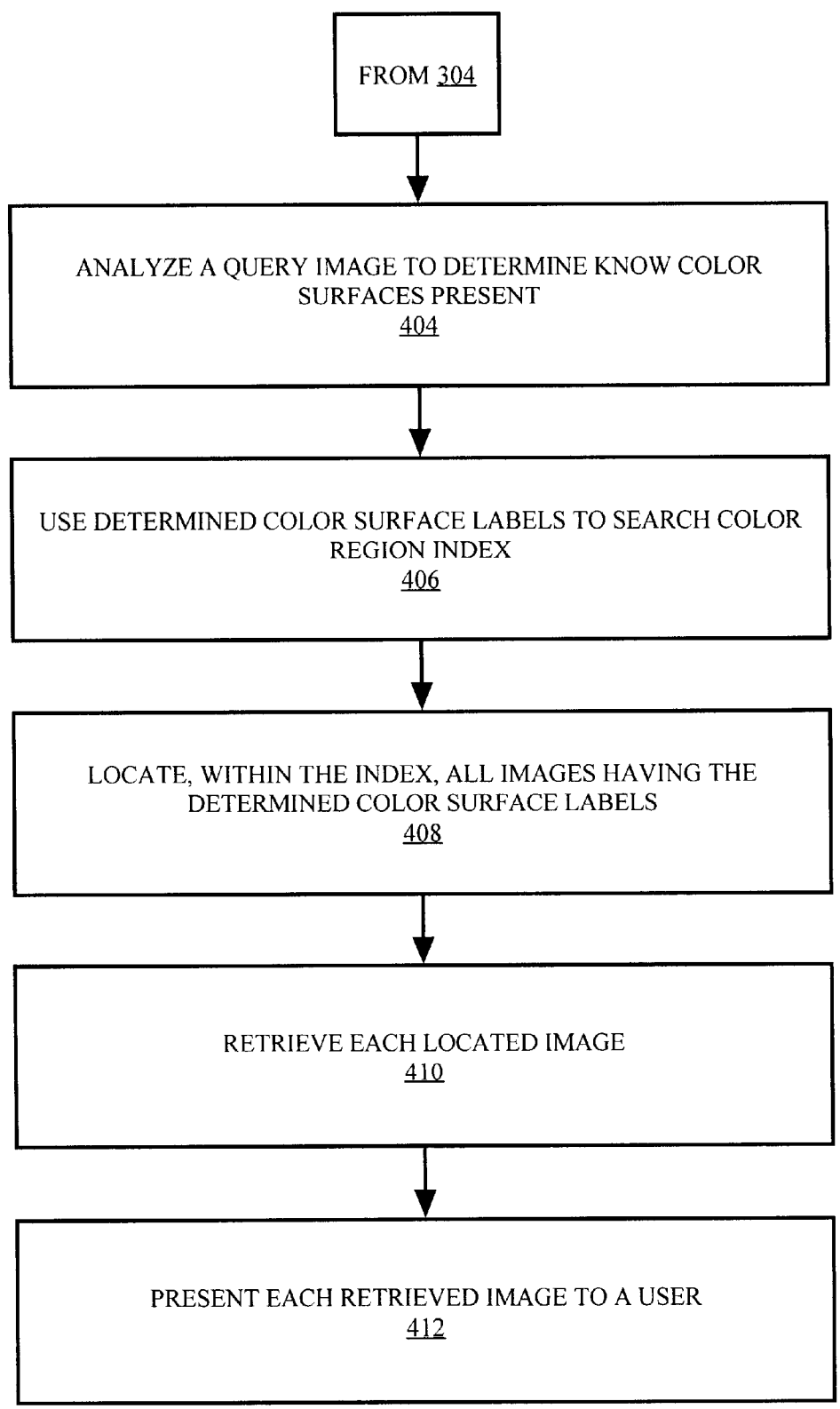
FIG. 4 illustrates a method of retrieving images, according to the present invention, in response to queries by images.

One powerful aspect of image databases is the possibility of querying for images which are similar to a known image. Thus, a query consisting of an image, rather that a semantic label, is also considered within the scope of an embodiment of the present invention and will result in the retrieval of images comprising similar color surface classes. A method for handling this type of query is illustrated in FIG. 4.

According to one embodiment of the present invention, in order to perform a query based on an image, known color surface classes within the image are first detected 404 and labeled according to the color code book; preferably using the method described in FIG. 2, although other segmentation methods are considered to be within the scope of the present invention. Next, the semantic labels from the detected, known color surface classes are extracted and used to search 406 the color region index, which was formed earlier 304, in order to locate images containing similar color surface classes.

All matching images and regions are located 408, retrieved 410 and then presented 412 to the user by an appropriate GUI.

In the above algorithm, the color code book with its semantic labels allows for the formation of the color region index for the entire database. Performing the indexing by pre-computation avoids searching for matching regions within images during image retrieval. Also, this algorithm allows the retrieving of images based on semantic color queries such as sky, grass, skin, etc. Another benefit derived from this system is that a single image is capable of having multiple semantic color labels and that the indexing method retains these multiple color labels when classifying the images.

CONCLUSION

A method and apparatus has been shown in the above embodiments for detecting regions in an image which belong to a particular color surface without first requiring pre-segmentation of the image. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by graphical user interface, computer operating system, computer hardware platform, image capturing hardware, initial color-space representation, database management system, or image encoding algorithm. In addition, the present invention can be implemented locally on a single PC, connected workstations (i.e. networked-LAN),across extended networks such as the Internet or using portable equipment such as laptop computers or wireless equipment (RF, microwaves, infrared, photonic, etc.)

What is claimed is:

1. In an unsegmented image in a first color space, a method of detecting and recognizing regions which belong to a particular color surface class, wherein color surface classes are represented by class clusters in a color code book with a code book color space, said method comprising the steps:

projecting each pixel of said unsegmented image into said code book color space;

within said code book color space, determining, for each said pixel, a set of closest color surface classes in said color code book;

preliminarily labeling each said pixel with at least one color surface class label corresponding to each color surface class of said set of closest color surface classes;

forming at least one region of pixels, wherein said at least one region comprises adjacent pixels having a similar color surface class label;

reprojecting said at least one region into said code book color space to form a corresponding cluster;

comparing said corresponding cluster to class clusters in said color code book associated with said similar color surface class label, and if said corresponding cluster matches one of said class clusters associated with said similar color surface class label, then labeling said region with a region identifier and said similar color class surface label.

2. In an unsegmented image in a first color space, a method of detecting and recognizing regions which belong to a particular color surface, as per claim 1, wherein said color code book is selected by considering a set of color surfaces anticipated to be present within said unsegmented image.

3. In an unsegmented image in a first color space, a method of detecting and recognizing regions which belong to a particular color surface, as per claim 1, wherein said set of closest color surface classes is determined according to each said pixel's difference with respect to class clusters in said color code book.

4. In an unsegmented image in a first color space, a method of detecting and recognizing regions which belong to a particular color surface, as per claim 3, wherein said difference is a distance between each of said pixels and a centroid of class clusters in said color code book.

5. In an unsegmented image in a first color space, a method of detecting and recognizing regions which belong to a particular color surface, as per claim 4, wherein said distance is a Mahalanobis distance.

6. In an unsegmented image in a first color space, a method of detecting and recognizing regions which belong to a particular surface, as per claim 4, wherein each said pixel is labeled with at least one of all color surface class labels which correspond to centroids whose distances to each of said pixels is less than a predetermined value.

7. In an unsegmented image in a first color space, a method of detecting and recognizing regions which belong to a particular color surface, as per claim 1, comprising the following steps:
calculating a mathematical representation of said corresponding cluster, and
comparing said mathematical representation to color codes, in said color code book, associated with said same color label, said color codes generated from class clusters.

8. In an unsegmented image in a first color space, a method of detecting and recognizing regions which belong to a particular color surface, as per claim 7, wherein said mathematical representation encodes the orientation of said corresponding cluster within said code book color space.

9. In an unsegmented image in a first color space, a method of detecting and recognizing regions which belong to a particular color surface, comprising the steps:
extracting a second color space from a color code book;
projecting each pixel of said unsegmented image to said second color space;
computing the distance from each said pixel in said second color space to centroids of clusters of color surfaces in said color code book;
assigning to each said pixel a color label corresponding to centroids whose Mahalanobis distance is less that a predetermined threshold;
forming at least one grouping of pixels wherein said at least one grouping comprises selected pixels which are adjacent and have a same color label;
reprojecting pixels from said at least one grouping into said second color space;
forming a first cluster of said reprojected pixels and determining said cluster's orientation within said second color space;
verifying a match between said first cluster's orientation and orientations of clusters; within said color code book, associated with same color label, and labeling said pixels of said first cluster with a region identifier and said same color label.

10. In an unsegmented image in a first color space, a method of detecting and recognizing regions which belong to a particular color surface, as per claim 9, wherein said color code book is selected based on color surfaces anticipated to be within said unsegmented image.

11. In an unsegmented image in a first color space, a method of detecting and recognizing regions which belong to a particular color surface, as per claim 9, wherein said distance is a Mahalanobis distance.

12. An article of manufacture comprising a computer medium having computer readable program code embodied therein which implements a detecting and a recognizing of regions in an unsegmented image that belong to a particular color surface class wherein color surface classes are represented by class clusters in a color space of a color code book, said computer readable program code comprising:
computer readable program code to project each pixel of said unsegmented image into said code book color space;
computer readable program code to, within said code book color space, determine a set of closest color surface classes in said color code book for each said pixel;
computer readable program code to preliminarily label each said pixel with at least one color surface class label corresponding to each color surface class of said set of closest color surface classes;
computer readable program code to form at least one region, wherein said at least one region comprises adjacent pixels having a similar preliminary color surface class label;
computer readable program code to project pixels of said region into said color space of said color code book to form a corresponding cluster;
computer readable program code to compare said corresponding cluster to class clusters in said color code book associated with said similar preliminary color surface class label, and
computer readable program code to permanently assign said similar color surface class to said region if said corresponding cluster matches one of said class clusters associated with said similar color surface class label.

13. An article of manufacture comprising a computer medium having computer readable program code embodied therein which implements a detecting and a recognizing of regions which belong to a particular color surface within an unsegmented image, as per claim 12, wherein said at least one color label is a color surface class label associated with one of a set of closest color surface classes in said color code book.

14. A system for recognizing and detecting regions which belong to a particular color surface in an unsegmented image comprising:
a plurality of color surfaces in a color code book with a code book color space, said color surfaces having a corresponding label and a corresponding code, said corresponding code generated from color surface clusters in a color space of said color code book;
an unsegmented image comprised of a plurality of pixels;
at least one of said corresponding labels assigned to each of said plurality of pixels, wherein said assigned label is determined by projecting each pixel of said unsegmented image into said code book color space;

determining, within said code book color space, a set of closest color surface classes in said color code book for each said pixel; and assigning to each said pixel at least one color surface class label corresponding to each color surface class of said set of closest color surface classes;

at least one region formed by grouping together ones of said plurality of pixels which are adjacent and have a similarly assigned corresponding label;

a region code generated from a region cluster formed by projecting pixels of said region into said color space of said code book;

a comparator, wherein said comparator determines if said at least one region code matches a corresponding code associated with said similarly assigned corresponding label, and wherein if said comparator finds a match, said at least one region is labeled according to said similarly assigned corresponding label.

15. A system for recognizing and detecting regions which belong to a particular color surface in an unsegmented image, as per claim 14, wherein said corresponding label is a semantic label.

16. A system for recognizing and detecting regions which belong to a particular color surface in an unsegmented image, as per claim 14, wherein said corresponding code represents said color surface in a manner invariant to changes in imaging conditions.

17. A system for recognizing and detecting regions which belong to a particular color surface in an unsegmented image, as per claim 14, wherein said image is realized in a first color space and said at least one region is realized in said code book color space.

18. A system for recognizing and detecting regions which belong to a particular color surface in an unsegmented image, as per claim 17, wherein said code book color space is an optimal color space considering said plurality of color surfaces.

19. A system for recognizing and detecting regions which belong to a particular color surface in an unsegmented image, as per claim 14, which further comprises a mathematical representation of said at least one region.

20. A system for recognizing and detecting regions which belong to a particular color surface in an unsegmented image, as per claim 19, wherein said mathematical representation encodes the orientation of said at least one region in said code book color space.

21. A system for recognizing and detecting regions which belong to a particular color surface in an unsegmented image, as per claim 20, wherein said comparator determines if said mathematical representation matches a corresponding code associated with said similarly assigned corresponding label.

22. A system for recognizing and detecting regions which belong to a particular color surface in an unsegmented image, as per claim 20, wherein said code book color space is an optimal color space considering said plurality of color surfaces.

* * * * *